July 9, 1968 A. EL BINDARI 3,392,126
SUPERCONDUCTIVE MATERIAL OF NbN AND ZrN
Filed Nov. 15, 1965
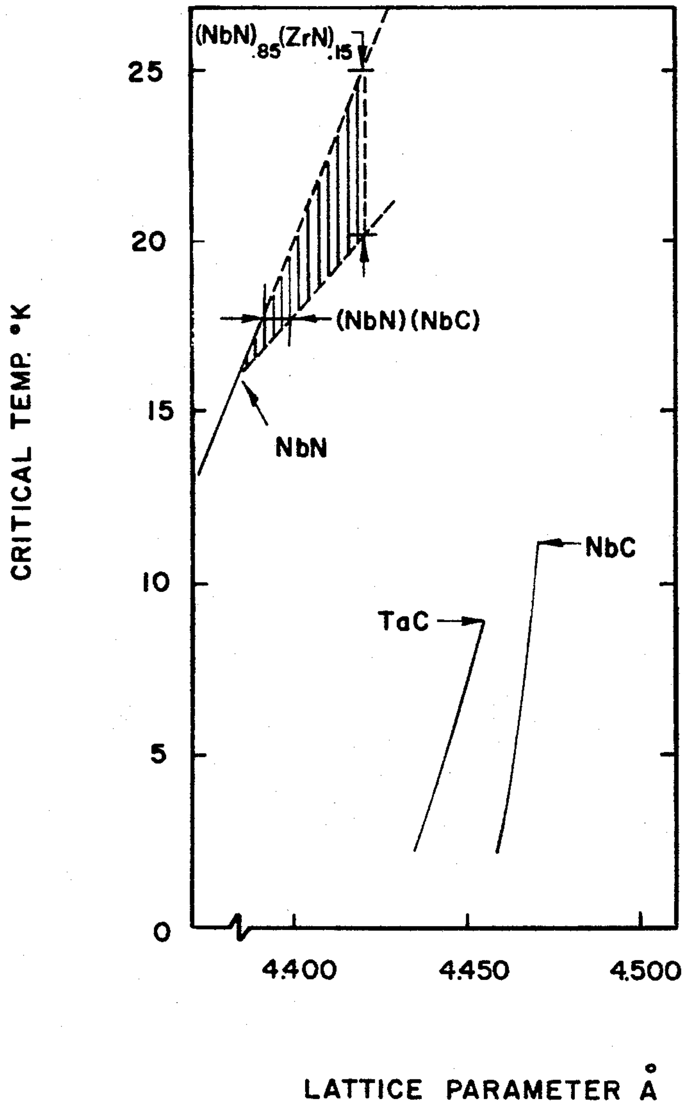
AHMED ELBINDARI
*INVENTOR.*
BY Alden D. Redfield
Melvin E. Frederick
ATTORNEYS

United States Patent Office 3,392,126
Patented July 9, 1968

3,392,126
SUPERCONDUCTIVE MATERIAL OF NbN AND ZrN

Ahmed El Bindari, Cambridge, Mass., assignor to Avco Corporation, Cincinnati, Ohio, a corporation of Delaware

Filed Nov. 15, 1965, Ser. No. 507,854
1 Claim. (Cl. 252—520)

This invention relates to superconductive material and more particularly superconductive material comprising niobium nitride and zirconium nitride.

The phenomenon of superconductivity has been known and intensively studied for over fifty years and although over 900 materials have been studied, so far as is known, there is no certain theoretical way of predicting which combination of materials will make superconductors with desirable physical properties and particularly superconductive materials with a critical temperature higher than 20.4° K.

Superconductive material having a critical temperature higher than 20.4° K. is particularly useful because it will permit the use of hydrogen as a heat transfer medium in place of the presently used liquid helium. Hydrogen is desirable as a refrigerant because it is much more abundantly available, is less expensive, and is more effective for heat transfer than helium. Thus, a superconductive material having a critical temperaure of 22° K. would not only be useable in liquid hydrogen which has a boiling point of 20.3° K. but at the temperature of slush hydrogen (13.8° K.) it would have very approximately a critical field of 40% of the critical field at absolute zero.

In accordance with the present invention, there is provided a superconductive material having a critical temperature in excess of about 20.3° K. The superconductive material in accordance with the present invention comprises niobium nitride and zirconium nitride.

It is the principal object of the present invention to provide an improved superconductive material.

It is another object of the present invention to provide a superconductive material having a critical temperature in the region of 20.3° K.

It is a further object of the present invention to provide a superconductive material comprising niobium nitride and zirconium nitride.

The novel features that are considered characteristic of the invention are set forth in the appended claims; the invention itself, however, both as to its organization and method of operation, together with additional objects and advantages thereof, will best be understood from the following description of a specific embodiments, when read in conjunction with the accompanying drawing which is a graphic illustration of the range of critical temperatures that can be expected of the present invention.

$Nb_3Sn$ has a critical temperature of 18.5° K. which is the highest critical temperature which is known with any certainty. The intermetallic compound $Nb_3Sn$ has the $\beta$W structure ($A_{15}$). In this $A_3B$ structure, the B atoms form a body centered cubic superlattice while the A atoms form a chainlike arrangement in three orthogonal directions. No significant increase in critical temperature has been achieved in the $A_3B$ compound by alloying and the results have led to a minimum.

In contrast to the $\beta$W compounds, I have found that the nitrides and the carbides of the transitional elements behave more like the solid solutions of the transitional elements and that they are more predictable. Referring now by way of example to the compounds NbN, NbC, TaC and ZrN, they all crystallize in the NaCl structure ($B_1$ f.c.c.), they form a continuous series of solid solutions with each other, and they are superconductors with a relatively high critical temperature. The highest among them is NbN with a critical temperature of about 15.8° K. at the exact stoichiometric composition. The NaCl crystal structure is maintained only with compositions of N and C up to the stoichiometric whereas additional N or C results in segregation of elements. Consequently, the stoichiometric composition represents the maximum critical temperature. This is dramatically shown in the drawing where the critical temperature is plotted as a function of the lattice parameter. The solid lines are averages of experimental data and the dashed area in the upper left hand corner of the drawing represents the critical temperature that may be expected for the binary system (NbN)—(ZrN) in accordance with the present invention. The maximum temperature of 17.8° K. for the composition (NbN)—(NbC) developed by B. T. Mathias is shown in the drawing. For a further discussion, reference is made to "Transition Temperatures of Superconductors" by B. T. Mathias, Physical Review, vol. 92, No. 4, p. 874, November 1953.

Referring now to the system (NbN)—(ZrN) of the present invention, it will be observed that a substantial increase in critical temperature may be obtained over that, for example, of the aforementioned system (NbN)—(NbC). The system (NbN)—(ZrN) has an electron/atom ratio of five and the value of density of electronic states N(o) at the Fermi surface is the same as for $Nb_3Sn$. The uppermost curve is schematically shown in the drawing to illustrate that the system (NbN)—(ZrN) in accordance with the present invention has a critical temperature substantially in excess of the system (NbN)—(NbC).

It will now be seen, as is shown in the drawing, that extrapolation of the pure NbN line with change in lattice parameter provides a maximum critical temperature of about 25° K. near the composition $(NbN)_{.85}(ZrN)_{.15}$ which may be expected to occur at the electron/atom ratio of about 4.8. The area enclosed within the dashed lines in the drawing takes into account uncertainty in the actual composition. As is shown in the drawing, the lower value of the critical temperature is above about 20° K. for the composition $(NbN)_{.85}(ZrN)_{.15}$. Since the Debye temperature of NbN is 256° K. which is the same as that of pure Nb, it is not expected that this will result in substantial restriction of the critical temperature.

The system (NbN)—(ZrN) may be produced in conventional manner and in common with other type $B_1$ crystals is brittle. While the effective use in superconducting coils of a superconducting material in accordance with the present invention presents problems of fabrication due to the brittleness of the material, a suitable conductor may be provided, for example, by deposition of the material on a substrate carrier such as, for example, by thermal evaporation in a vacuum or sputtering in an inert atmosphere. For a further discussion of the deposition of superconducting materials on a suitable substrate, reference is made to Patent No. 3,205,413, issued September 7, 1965.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A superconductive alloy material consisting essentially of eighty-five atomic percent niobium nitride and fifteen atomic percent zirconium nitride, said superconductive alloy material having a critical temperature in excess of 17.8° K.

(References on following page)

References Cited

UNITED STATES PATENTS 3,253,191 5/1966 Treuting et al. -------- 75—177

FOREIGN PATENTS 866,119 4/1961 Great Britain.

OTHER REFERENCES

Chemical Abstract, vol. 24, col. 5565[3], vol. 25, col. 1135[6], vol. 46, col. 10752*b* and vol. 51, col. 18*d*.

LEON D. ROSDOL, *Primary Examiner.*

J. D. WELSH, *Assistant Examiner.*